United States Patent [19]

Di Maria

[11] Patent Number: 5,106,120

[45] Date of Patent: Apr. 21, 1992

[54] VEHICLE SUSPENSION SYSTEM

[76] Inventor: Philip Di Maria, 18 Catherine Street, Morwell, 3840, Victoria, Australia

[21] Appl. No.: 445,699

[22] PCT Filed: Mar. 25, 1988

[86] PCT No.: PCT/AU88/00085

§ 371 Date: Nov. 20, 1989

§ 102(e) Date: Nov. 20, 1989

[87] PCT Pub. No.: WO88/07455

PCT Pub. Date: Oct. 6, 1988

[30] Foreign Application Priority Data

Mar. 27, 1987 [AU] Australia ............................ PI1116/87

[51] Int. Cl.$^5$ .............................................. B60G 11/64
[52] U.S. Cl. ..................................... 280/689; 280/707;
280/723; 280/714; 137/45; 137/625.23
[58] Field of Search ............... 280/707, 714, 689, 709,
280/721, 723, 715; 267/25, 186, 277; 137/45,
46, 625.22, 625.23; 251/297

[56] References Cited

U.S. PATENT DOCUMENTS

| 1,971,959 | 8/1934 | Huntman ............................ 280/689 |
| 2,678,704 | 5/1954 | Campeau ............................ 137/45 |
| 2,684,254 | 7/1954 | Goss .................................. 137/45 |
| 2,849,225 | 8/1958 | Lucien ............................... 280/708 |
| 3,197,233 | 7/1965 | Van Winsen et al. ............. 280/723 |
| 3,582,153 | 6/1971 | Pitcher .............................. 137/45 |
| 3,792,872 | 2/1974 | Jones ................................. 137/45 |
| 4,066,278 | 1/1978 | Takagi ............................... 280/710 |
| 4,206,935 | 6/1980 | Sheppard et al. .................. 280/723 |
| 4,834,419 | 5/1989 | Kozaki et al. ..................... 280/723 |
| 4,842,298 | 6/1989 | Jarvis ................................ 280/689 |
| 4,892,329 | 1/1990 | Kozaki ............................... 280/723 |

FOREIGN PATENT DOCUMENTS

| 234808 | 9/1987 | European Pat. Off. . |
| 2284473 | 4/1976 | France . |
| 166105 | 7/1987 | Japan ................................. 280/707 |
| 13806 | 1/1988 | Japan ................................. 280/707 |
| 263124 | 10/1988 | Japan ................................. 280/707 |
| 895095 | 5/1962 | United Kingdom . |
| 1015846 | 1/1965 | United Kingdom . |
| 2006131 | 5/1979 | United Kingdom ............... 280/689 |
| 2224247 | 5/1990 | United Kingdom ............... 280/707 |

Primary Examiner—Kenneth R. Rice
Assistant Examiner—Tamara L. Finlay
Attorney, Agent, or Firm—Flehr, Hohbach, Test, Albritton & Herbert

[57] ABSTRACT

An antiroll suspension for a vehicle, the suspension having a bar which is mounted transversely of the vehicle, the bar being coupled to a fixed strut and an extensible strut. The suspension includes control elements to control the extension and retraction of the extensible strut in proportion to laterally directed centrifugal forces acting on the vehicle during cornering so as to counter the effects of vehicle body roll.

27 Claims, 12 Drawing Sheets

VEHICLE SUSPENSION SYSTEM

This invention relates a vehicle suspension system.

It is known that when a vehicle such as an automobile travels around a corner, centrifical forces acting on the vehicle tend to cause body roll which if severe can cause instability. The problem is more pronounced with vehicles which have a relatively high centre of gravity such as trucks or vans.

Some attempts have been made to provide antiroll suspensions to alleviate the effects of centrifugal forces which act on the vehicle body during cornering. One arrangement utilizing an antiroll bar is disclosed in Australian patent application No. 40,435/78. That arrangement includes a strut which includes an hydraulic ram which can be locked so as to have a fixed length in which condition the antiroll bar is effective. The ram can be unlocked so that the strut is variable in length and the effectiveness of the antiroll bar is eliminated.

Other arrangements, such as U.S. Pat. No. 2,849,225, utilize rams to alter the geometry of the suspension when the vehicle is cornering with a view to reducing body roll. The arrangements, generally speaking, suffer from over-complexity.

The object of the present invention is to provide a relatively simple form of antiroll suspension.

According to the present invention there is provided a antiroll suspension for a vehicle comprising a bar which, in use, is mounted transversely on the vehicle for rotation about an axis, first and second arms extending from the bar, third and fourth arms pivotally connected to the first and second arms respectively, the third and fourth arms being coupled to the axles of a pair of wheels of the vehicle, and wherein at least one of the arms includes an extensible ram which on operation thereof to effectively alter the length of said at least one arm, and control means to control extension and retraction of said at least one arm generally in proportion to laterally directed centrifical forces applied to the vehicle, in use.

The invention will now be further described with reference to the accompanying drawings in which.

Figure 3:
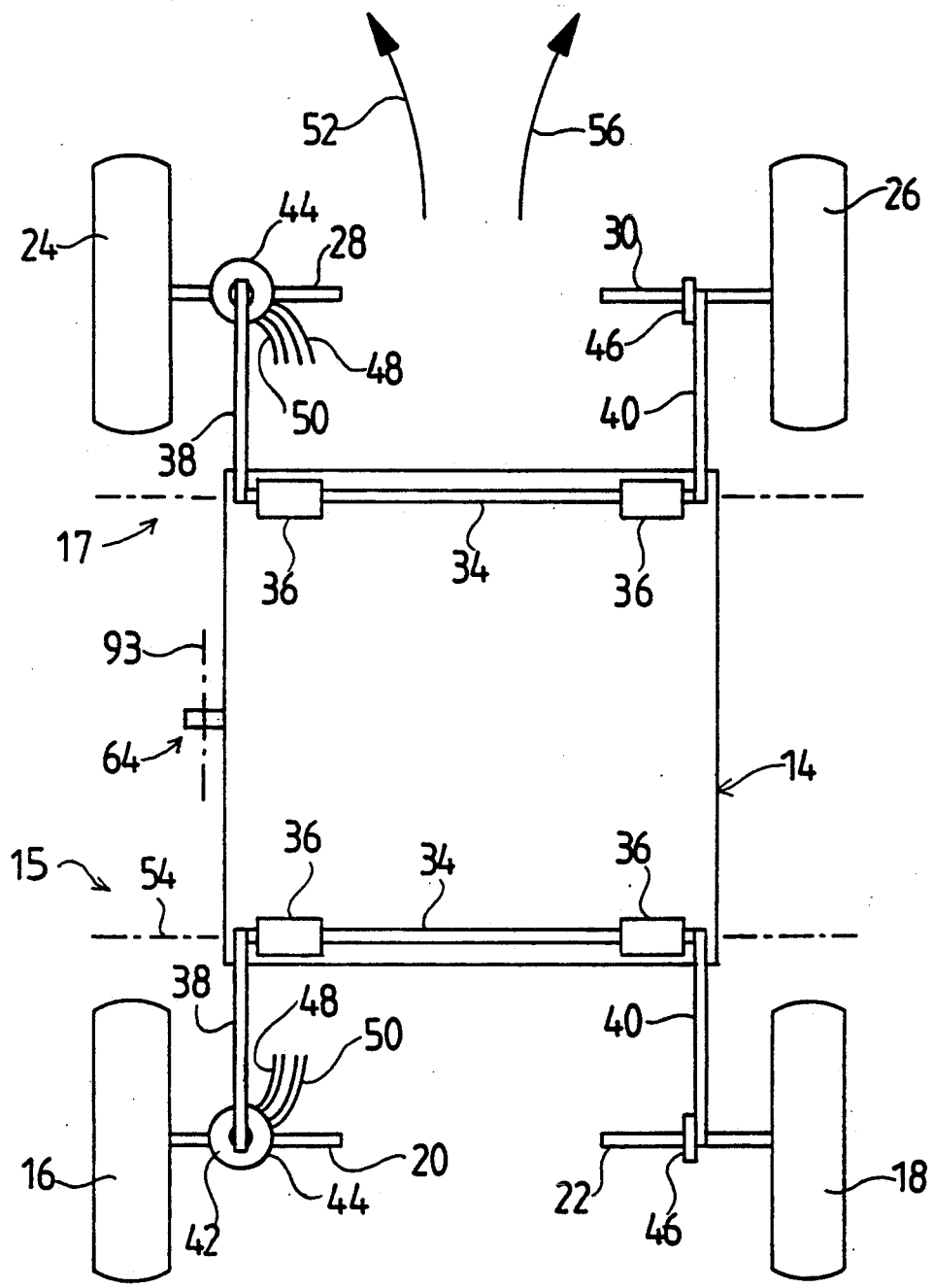
Figure 4:
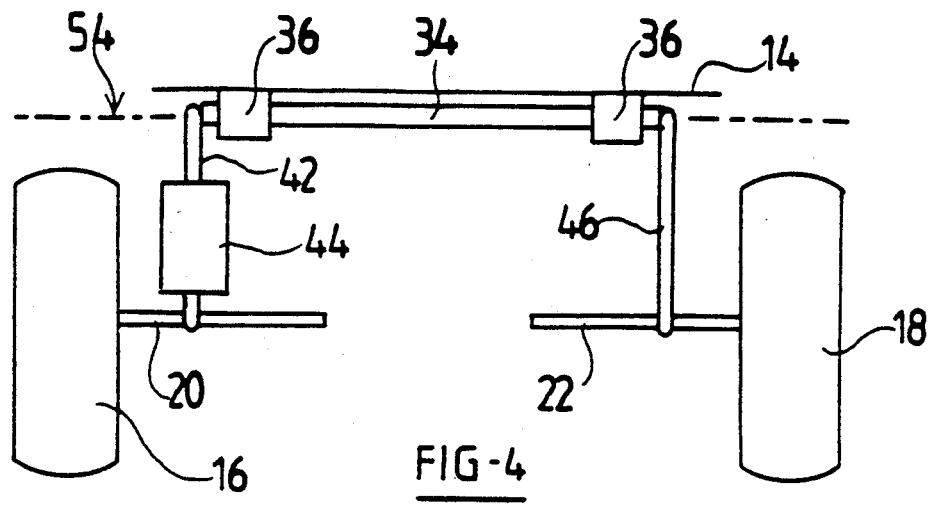
Figure 5:
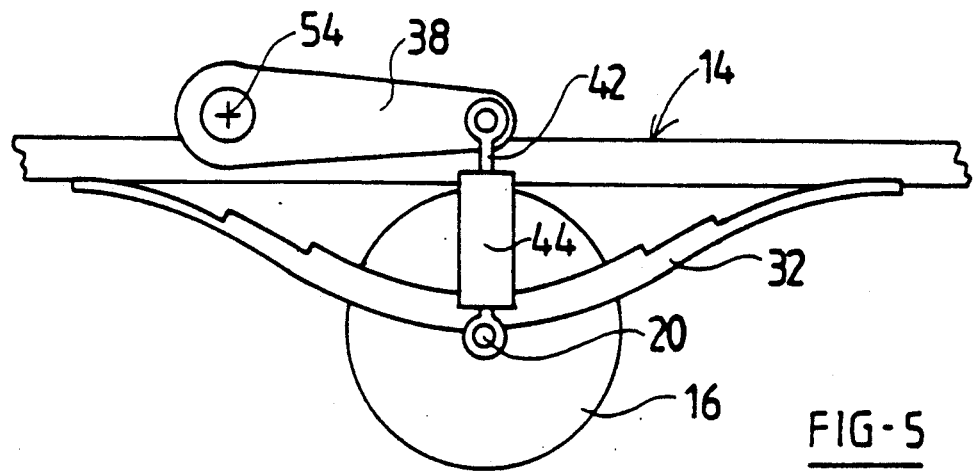
Figure 8:
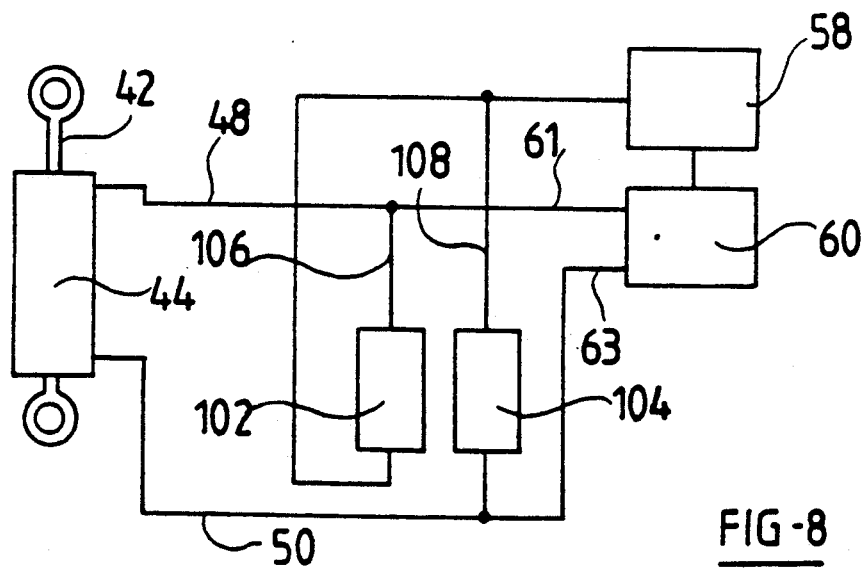
Figure 6:
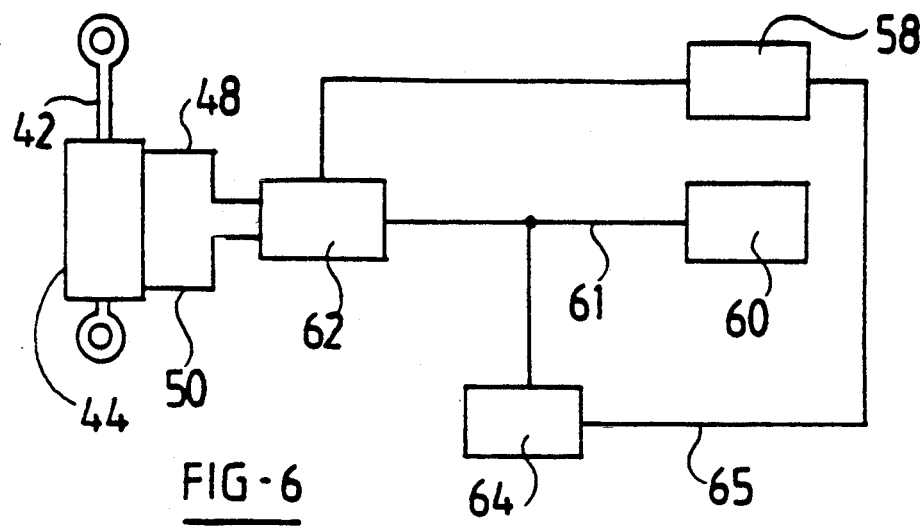
Figure 7:
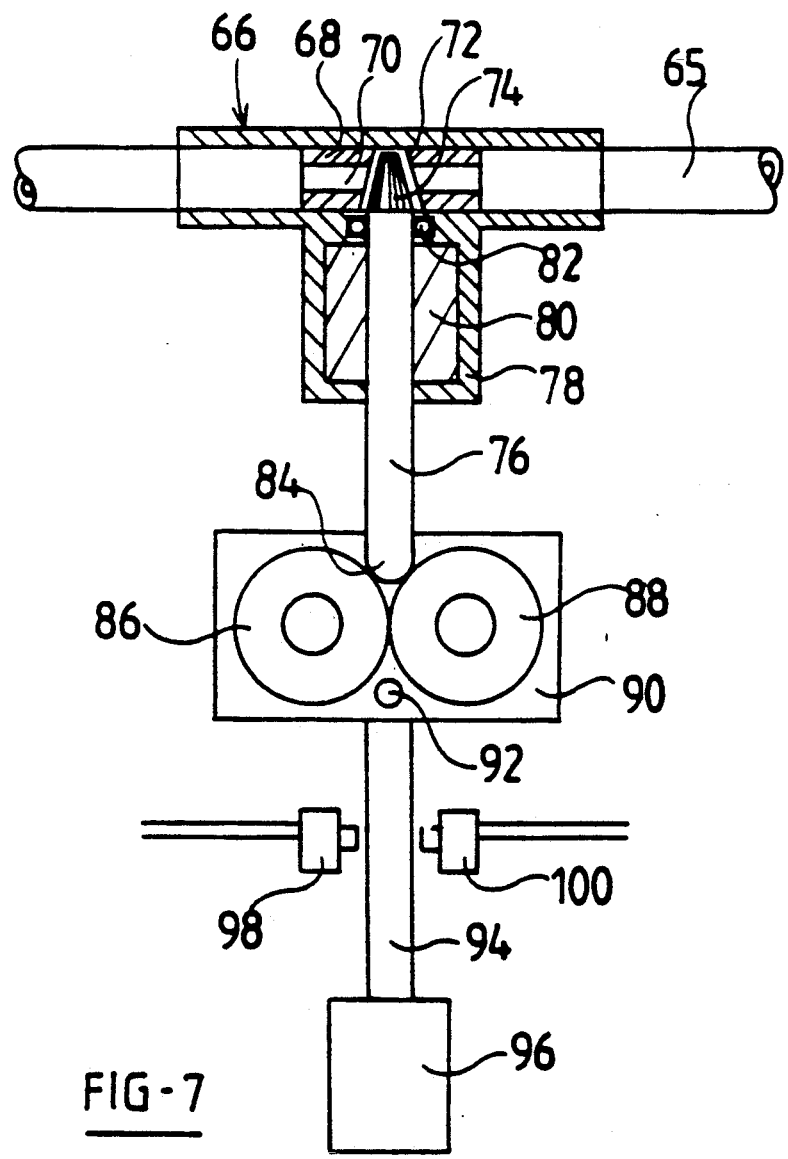
Figure 9:
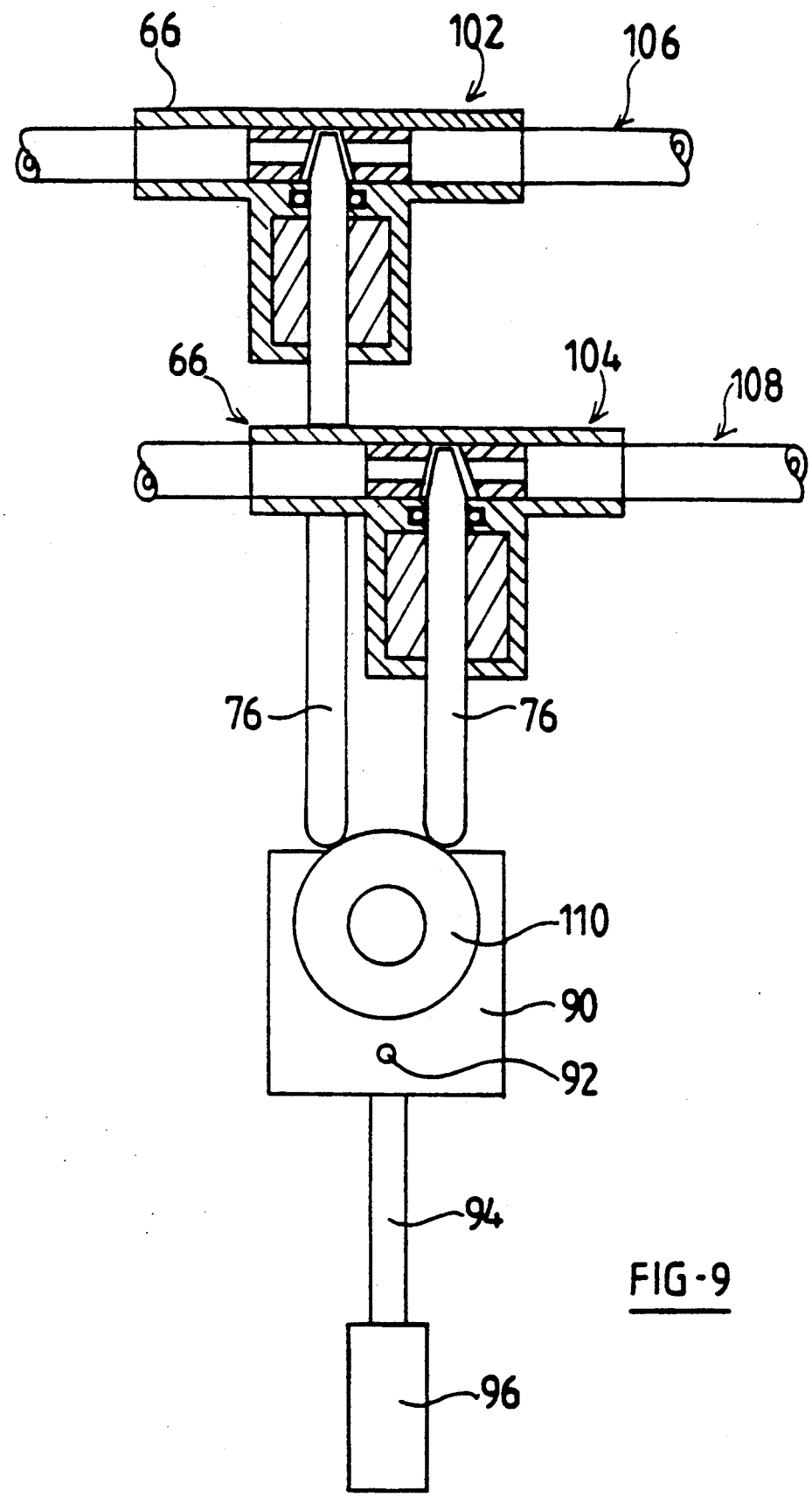
Figure 10:
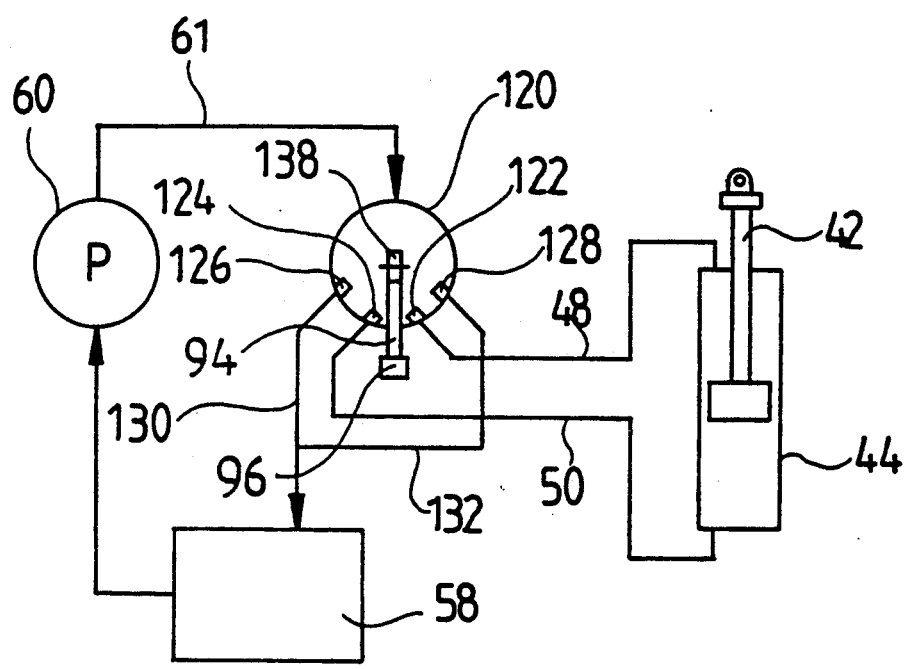
Figure 11:
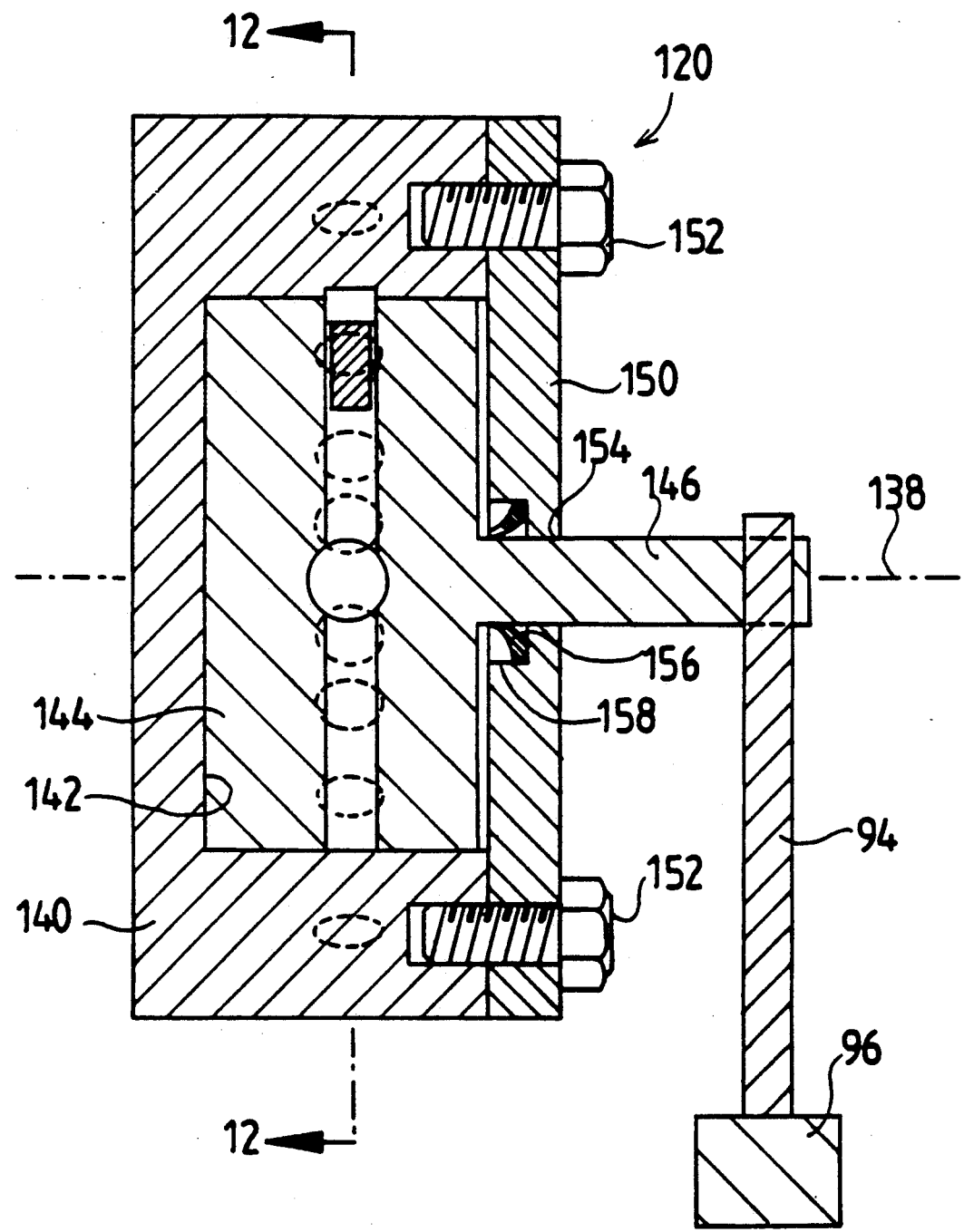
Figure 12:
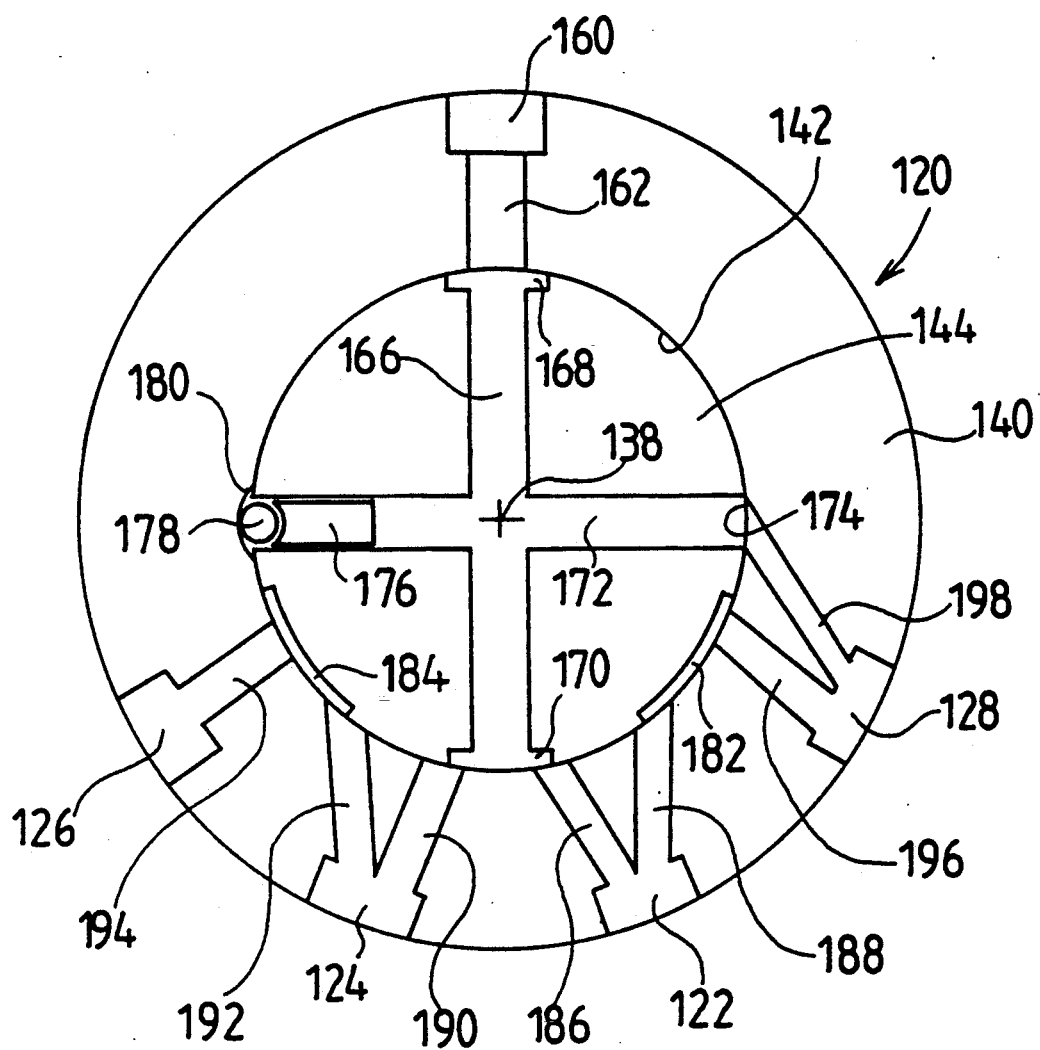
Figure 13:
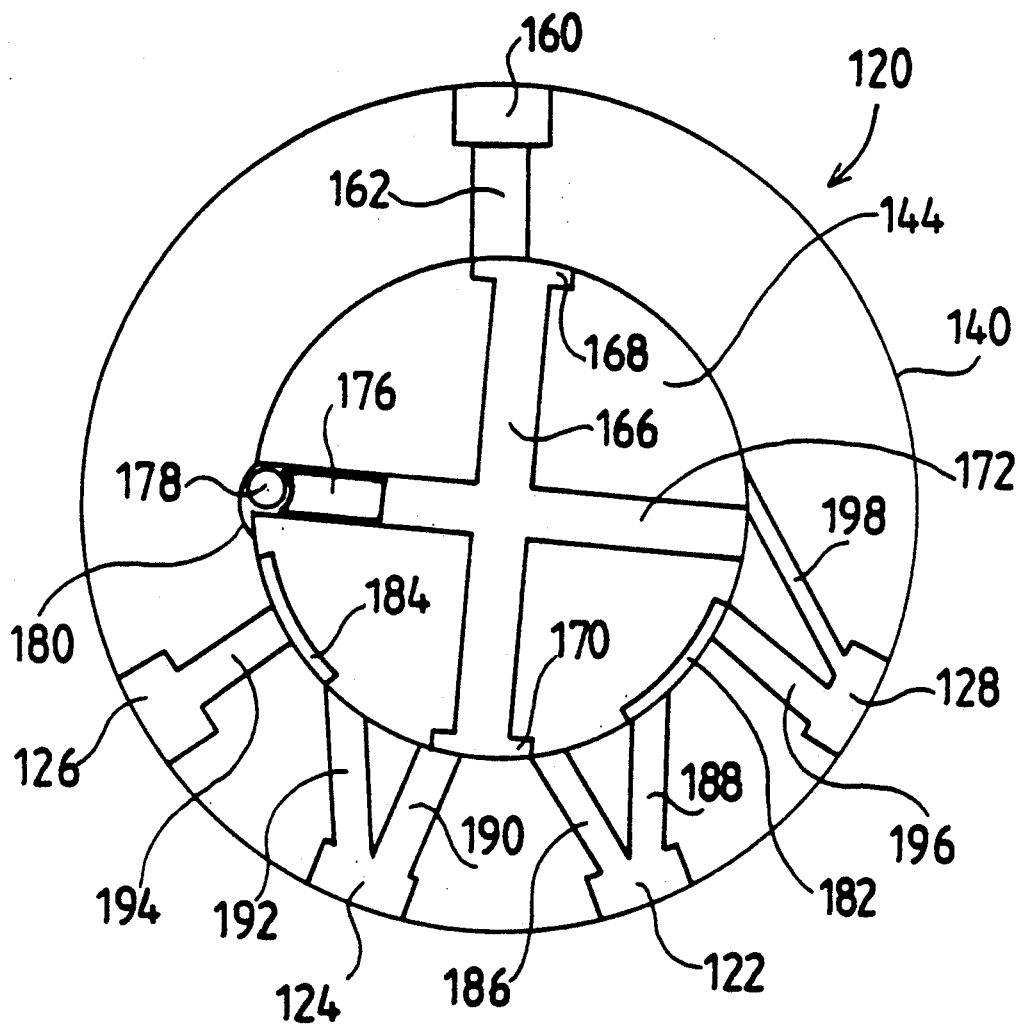
Figure 14:
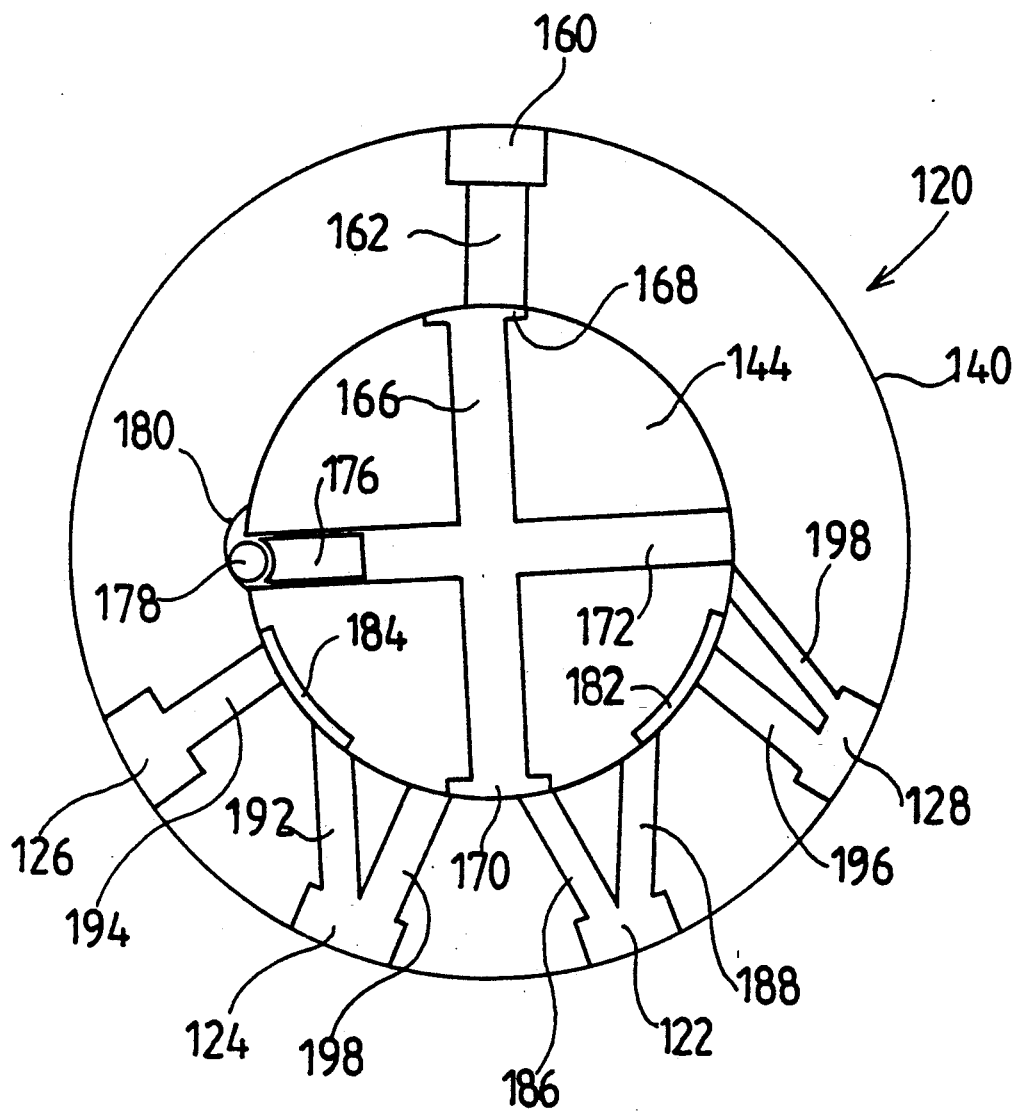
Figure 15:
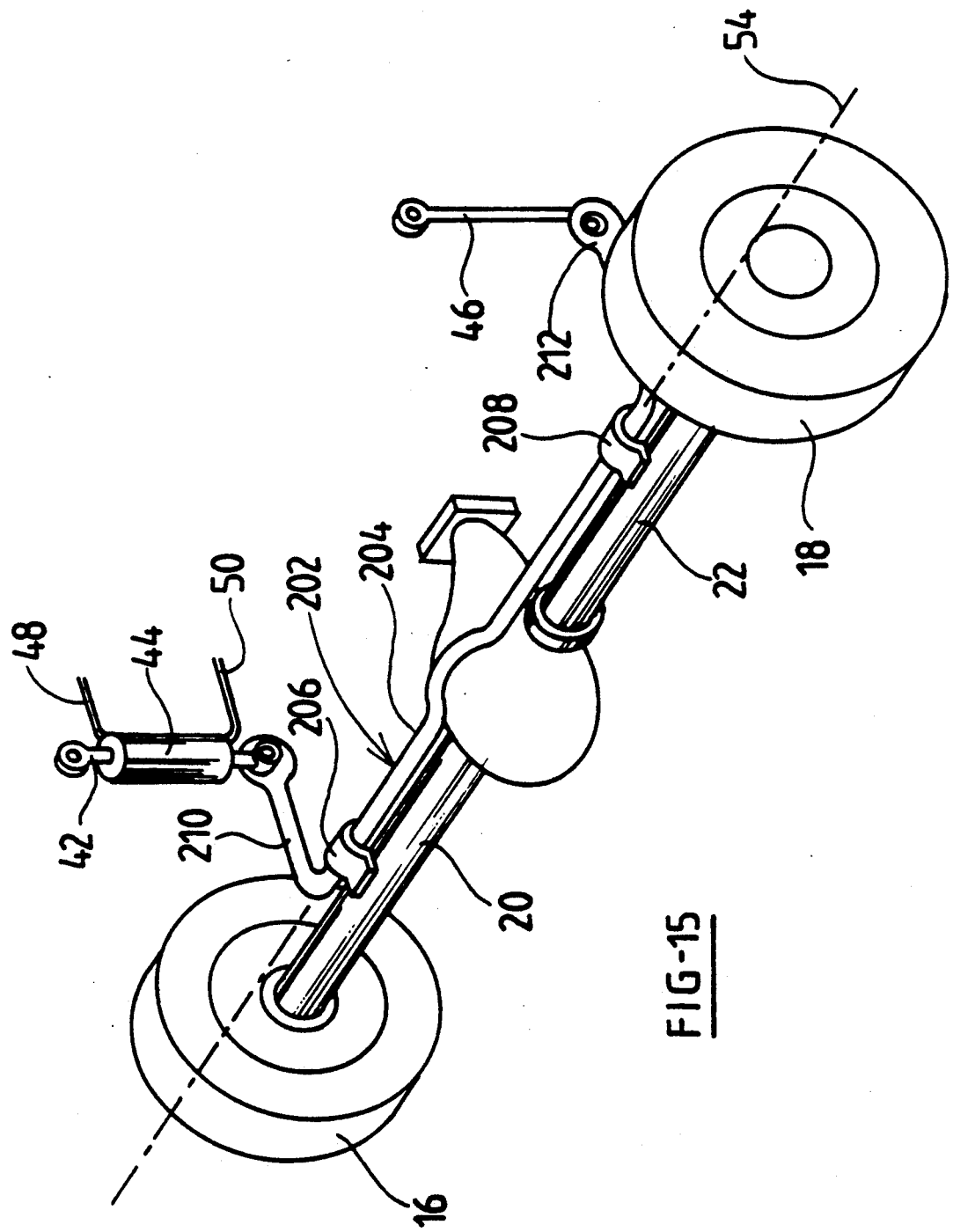
Figure 16:
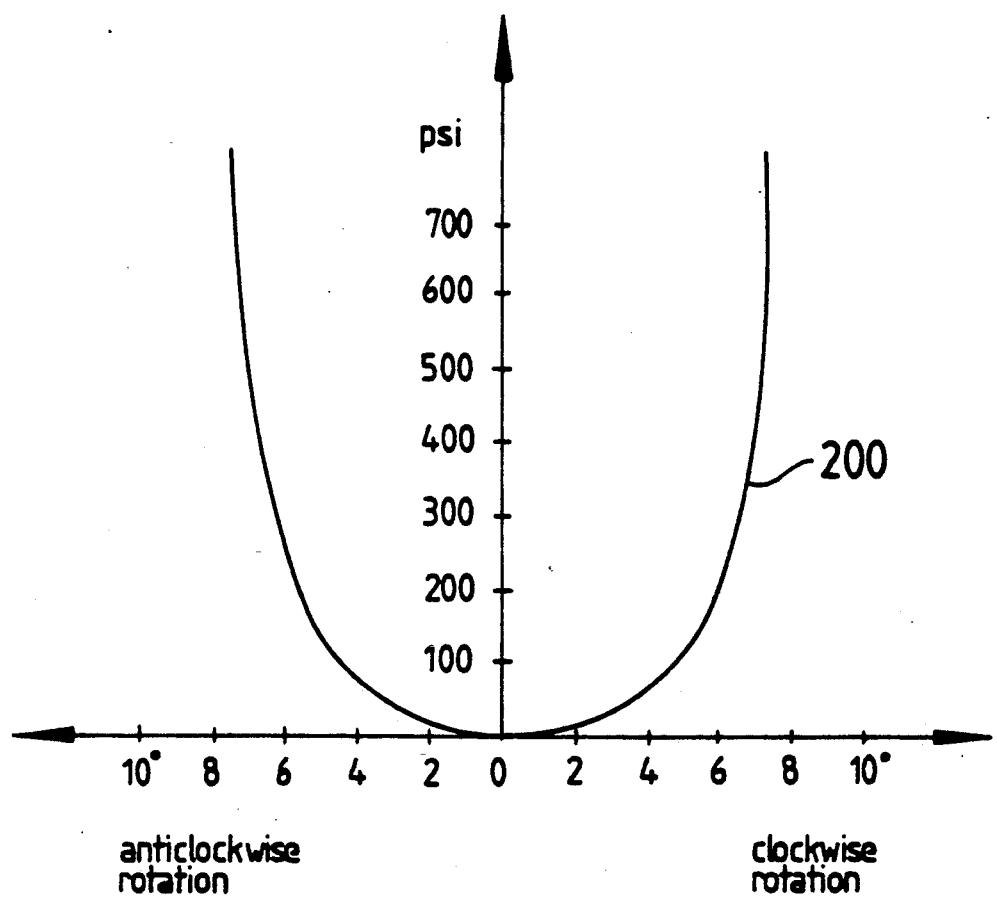

FIG. 3 is a schematic view of a vehicle having the vehicle suspension of the invention, FIG. 4 is a schematic rear view of the suspension, FIG. 5 is a schematic side view of the suspension, FIG. 6 is a schematic view of a control system for the suspension, FIG. 7 is a schematic view of a control valve for the system, FIG. 8 is a modified form of control system, FIG. 9 is a modified form of control valve for the system, FIG. 10 is a schematic view of an antiroll suspension which incorporates a preferred form of pendulum activated valve, FIG. 11 is a longitudinal cross section through the preferred form of valve, FIG. 12 is a cross sectional view along the line 12—12, FIG. 13 shows the valve element rotated in a clockwise direction, FIG. 14 shows the valve element rotated in a anti clockwise direction, FIG. 15 is a schematic view of a modified form of the invention system, and FIG. 16 is a graph showing a typical pressure variation versus angular displacement of the valve element.

Figure 1:
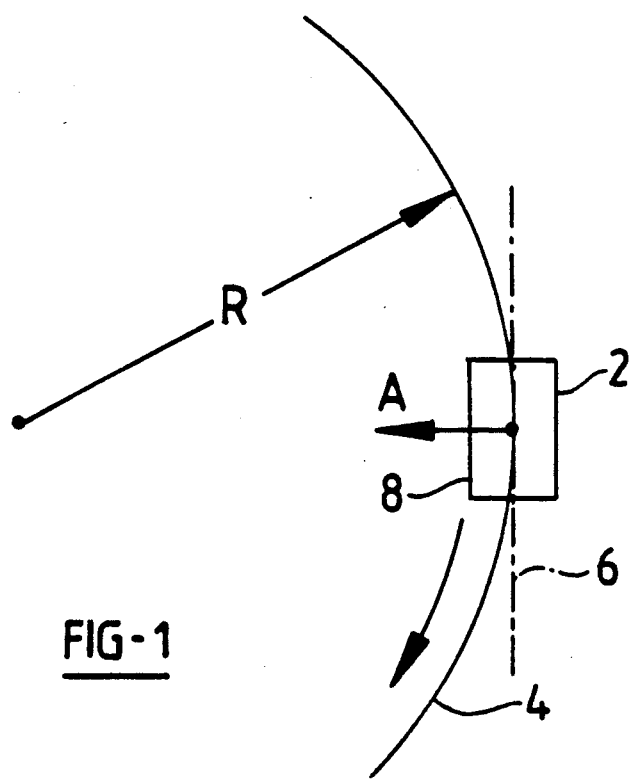
FIG. 1 is a schematic view of a vehicle turning on a circular path.
Figure 2:
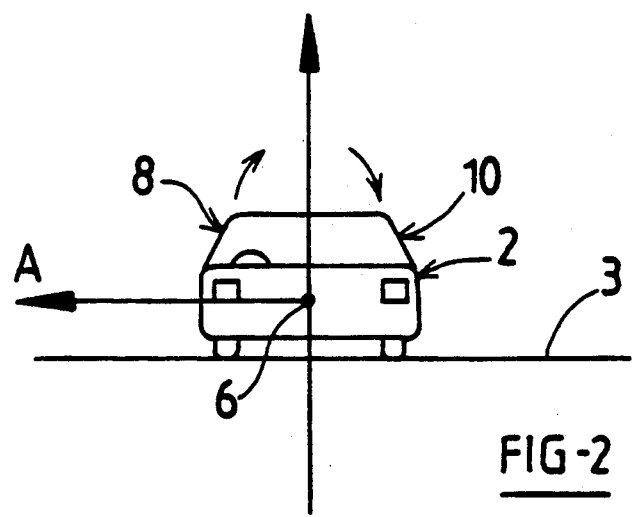
FIG. 2 is a front view of the vehicle.

FIG. 1 shows a vehicle 2 travelling in a circular path 4 of radius R. The vehicle will be subjected to a centrifugal acceleration which is proportional to $V^2/R$ where V is velocity of vehicle. The accelaration tends to rotate the vehicle about an axis 6 which is generally horizontal and tangential to the circular path 4, the inner side 8 of the vehicle tending to lift whereas the outer side 10 of the vehicle tending to move closer to the road 3. In accordance with the invention, the vehicle 2 has modified rear and front suspensions 15 and 17 (see FIG. 3) which tends to counteract the body roll. Thus, on cornering, the suspension tends to raise the side of the vehicle on the outside of the turn and this causes a consequential lowering of the vehicle on the inner side of the turn, as will be explained hereinafter.

FIG. 3 diagrammatically illustrates a vehicle chassis 14 to which the rear and front suspensions 15 and 17 of the invention are coupled The vehicle has rear wheels 16 and 18 mounted on axles 20 and 22. The vehicle has front wheels 24 and 26 mounted on axles 28 and 30. The axles are connected to the chassis 14 by means of springs 32 one of which is shown in FIG. 5. The springs 32 can be of conventional design and shock absorbers (not shown) can be fitted in the usual way.

The rear suspension 15 includes a bar 34 which extends transversely of the vehicle and upwardly and forwardly of the axles 20 and 22. The bar 34 is mounted for rotation by means of a pair of sleeves 36 provided with rubber bushings (not shown). Rearwardly extending arms 38 and 40 extend from the ends of the bar 34. The free end of the arm 38 is pivotally connected to the upper end of a ram 42 of a double acting hydraulic cylinder 44. The lower end of the cylinder 44 is pivotally connected to the axle 20 or the one of the springs 32.

The free end of the arm 40 is connected to a link 46, the lower end of the link being pivotally connected to the axle 22 or the spring coupled to that axle. The length of the link 46 is the same as the effective length of the cylinder and ram 42, in its neutral position, that is to say with equal (or zero) pressure applied to its actuating hydraulic lines 48 and 50. The geometry of the arrangement is such that in the neutral position of the ram 42, the suspension 16 of the invention has substantially zero effect on the vehicle. Thus, if the vehicle is travelling in a straight line or the supply of pressurized fluid to the lines 48 and 50 is discontinued, the conventional suspension on the vehicle will function in its usual way. In accordance with the invention however, when the vehicle is cornering, the pressure to the lines 48 and 50 is altered in such a way as to raise or lower the ram 42 in accordance with the direction of the cornering. This counteracts the effect of body roll and makes the vehicle more stable. More particularly, if the vehicle is travelling in a curved path as indicated by arrow 52, the ram 42 will be withdrawn causing a rotation of the arm 38 and bar 34 about the axis 54 of the bar. At the other side of the vehicle, the arm 40 will be rotated with the bar 34 but the linkage 46 will rotate in such a way as to increase the vertical distance between the axis 54 and the road 3. Because the bar is coupled to the chassis 14 of the vehicle, the effective lowering of the suspension at the inner side of the vehicle tends to counteract the effect of body roll.

When the vehicle travels in a circular path in the opposite direction, as indicated by arrow 56, the ram 42 extends from its neutral position so as to rotate the arm 38, bar 34 and arm 40. This causes an effective increase in the verticle height of the end of the bar 34 relative to the road, at the side of the vehicle where the wheel 16 is located. At the inner side, where the wheel 18 is located, there will be a corresponding reduction in the effective height.

The front suspension 17 functions in an analogous manner and corresponding parts have been given the same reference numerals. The operation of the front suspension 17 need not be described in detail. The lines 48 to the front and rear cylinders 44 are connected in parallel as are the lines 50.

FIG. 6 shows diagrammatically a control system for controlling hydraulic fluid to the front and rear cylinders 44 via the lines 48 and 50. The hydraulic system includes a reservoir 58 coupled to a pump 60 output from which is connected to a control valve 62 via line 61. A pressure regulating valve 64 is located in a bypass line 65 which extends between the line 61 and the reservoir 58. The control valve 62 comprises a four-way solenoid valve which receives electrical control signals to control its internal connections. The electric control signals are such that if the vehicle is travelling a straight line, the hydraulic fluid is returned to the reservoir 58, there being zero or low equal pressure in the lines 48 and 50. The ram 42 will thus be in its neutral position. If however a signal is applied to the valve 62 indicating that the vehicle is subjected to centrifugal forces, the valve will change its internal connections so that one or other of the lines 48 or 50 will receive hydraulic fluid at a relatively high pressure and will therefore cause a consequential extension or retraction of the ram 42.

The pressure control valve 64 acts as a bypass valve in the output line 61 from the pump to the valve 62. The function of the valve 64 is such that, when the vehicle is subjected to relatively large centrifugal forces, it tends to close thereby restricting the return path to the reservoir 58 and consequentially increasing the pressure in the line 61. The degree of opening or closing of the valve 64 is preferably proportional to the centrifugal forces applied to the vehicle. In this way the degree of extension or retraction of the ram 42 is proportional to the centrifugal forces.

FIG. 7 diagrammatically illustrates one arrangement for the control valve 64. It comprises a tubular body 66 connected in the bypass line 65. Located within the body 66 is a sleeve 68 having a fluid flow passage 70 therethrough. The sleeve 68 includes a frusto-conical valve seat 72 which cooperates with a complementary valve element 74 formed at the end of a slidable spindle 76. The body 66 includes a support boss 78 and bush 80 for constraining the spindle 76 to sliding movement. An O-ring 82 is formed in the boss 78 to prevent fluid leakage past the spindle.

The spindle 76 has a rounded end 84 which is located between a pair of rollers 86 and 88 mounted upon a plate 90, the plate in turn being pivotally connected about a pivot point 92. In use of the valve, the pivot point is mounted on the chassis 14 so that its axis 93 is parallel to the longitudinal axis of the vehicle, as seen in FIG. 3. The plate 90 has depending therefrom a rod 94 to which is connected a weight 96. The arrangement is such that when the vehicle turns, the weight 96 will tend to rotate the plate 90 in a direction and to a degree which is related to the angular acceleration and the direction of turning of the vehicle. Rotation of the plate 90 causes one or other of the rollers 86 or 88 to displace the rounded end 84 of the spindle 76 upwardly (as seen in FIG. 7) so as to tend to reduce the fluid flow passage through the passage 70. This reduces the effectiveness of the bypass line 65 and thus increases the pressure in the line 61. The amount of displacement of the spindle 76 is related to the size of the acceleration attributable to the turn of the vehicle.

A pair of microswitches 98 and 100 can be associated with the rod 94 (or plate 90) to be used to control the operation of the solenoid valve 62 so that it in turn causes the ram 42 to be retracted or extended as required.

The control lines 48 and 50 can be connected in parallel to the cylinder 44 in the front suspension 17 of the vehicle. Alternatively a separate valve 62 could be provided.

In modified arrangement, the link 46 could be replaced by a cylinder and ram which operate in a complementary manner to the ram and cylinder 42 and 44 but this would be more expensive.

A modified arrangement of the invention is diagrammatically illustrated in FIG. 8. In this arrangement, the solenoid valve 62 is eliminated and a pair of control valves 102 and 104 are provided so as to give the required sense of operation for the rams and the degree of extension thereof. In this arrangement, the pump 60 has separate output lines 61 and 63 connected to lines 48 and 50 respectively. A pair of associated control valves 102 and 104 is provided. The valve 102 is connected in a bypass line 106 which extends from the line 48 to the reservoir 58 The valve 104 is connected in a bypass line 108 from the line 50 the reservoir 58. The two valves 102 and 104 are each similar to that illustrated in FIG. 7 except that their rounded ends 84 are associated with a single roller 110 which is mounted on the plate 90, as before. It will be appreciated that on rotation of the plate 90 about the pivot point 92, one of the spindles 76 will be moved upwardly whereas the other will move downwardly. This has the effect of increasing the pressure in one of the lines 48 and 50 and decreasing it in the other by by-passing hydraulic fluid to the reservoir 58 Thus, the required displacement of the rams 42 can be achieved to give the required anti roll effect.

FIG. 10 diagrammatically illustrates a control system which incorporates a preferred form of rotary control valve 120. The rotary valve 120 replaces the control valve 62 and pressure regulator 64 of the arrangement shown in FIG. 6. The valve 120 has first and second outlet ports 122 and 124 which are connected to the lines 48 and 50 respectively. The valve 120 has third and fourth ports 126 and 128 which are connected by lines 130 and 132 to the reservoir 58. The valve 120 includes the pendulum arm 94 and pendulum mass 96 which function analogously to the corresponding components of FIG. 7. The valve is mounted so that the pendulum arm 94 can rotate about an axis 138 which is parallel to the longitudinal axis of the vehicle. In use, the pendulum arm 94 is caused to swing to the left or right in accordance with centrifugal forces acting on the mass 96 during cornering. The valve 120 is arranged to control the pressure in the lines 48 and 50 so as to control the extension and retraction of the ram 42 generally proportionately to the centrifugal forces acting on the vehicle. This causes the antiroll effect in the suspension, as described previously.

FIGS. 11 to 14 illustrate the valve 120 in more detail. It will be seen that the valve comprises a cylindrical valve body 140 having a cylindrical recess 142 therein. Located within the recess 142 is a cylindrical valve element 144. The valve element 144 includes a shaft 146 upon which the pendulum arm 94 is mounted. The valve includes a plate 150 connected to the body 140 by screws 152. The plate 150 has a bore 154 through which the shaft 146 passes. An oil seal 156 is located in a recess 158 formed adjacent to the bore 154. The seal 156 has a lip which bears against and forms a seal with the shaft 146.

FIG. 12 shows a transverse section through the valve 120 along the line 12—12 marked on FIG. 11. It will be seen that the ports 122, 124, 126 and 128 are formed in the outer periphery of the body 140. In addition, the body 140 includes an inlet port 160 which is connected to the line 61 from the pump 60. The port 160 communicates with a duct 162 which extends to the recess 142. The duct 162 communicates with a first transverse duct 166 which extends through the valve element 144. The duct 166 has wide end portions 168 and 170 which provide fluid communication after rotation of the element 144 relative to the body 140. The valve element 144 includes a second transverse duct 172, one end of the duct 172 having a port 174, the other end of the duct being provided with a piston 176 which is slidably mounted therein. The outer end face of the piston 176 is curved and bears against a roller 178. The roller 178 Projects laterally beyond the element 144 and is received in a curved cam surface 180 which is formed into the recess 142 of the body 140. In use of the valve, pressure in the duct 172 causes the piston 176 to force the roller 178 into engagement with the cam surface 180. This causes the valve element 144 to return under equilibrium conditions to the position shown in FIG. 12 with the roller 178 located in the centre of the cam surface 180. The valve element 144 includes first and second transfer passages 182 and 184 formed on its curved surface. The transfer passages 184 and 182 form selective communication paths with ducts which are formed in the body 140. The ducts formed in the body 140 include first and second ducts 186 and 188 which extend from the first port 122 to the recess 142. In the equilibrium position, as shown, the ducts 186 and 188 communicate with the port 170 and transfer passage 182 respectively. The body 140 includes third and fourth ducts 190 and 192 which extend from the second port 124 to the recess 142 to provide communication with the port 170 and passage 184 respectively. The body 140 includes a duct 194 which extends from the third port 126 to the recess 142 to provide communication with the passage 184. The body 140 includes a duct 196 which extends from the fourth port 148 to the recess 142 to provide communication with the passage 182. The body includes a pressure control duct 198 which extends from the fourth port 128 to the recess 142 to provide communication with the transverse duct 172 via the port 174.

In the position illustrated in FIG. 12, hydraulic fluid from the pump 60 will be at equal pressure in the ports 122 and 124 and hence the ram 42 will be in a central position of the cylinder 44. Hydraulic fluid can flow in this condition through a number of alternative paths to the reservoir 58. A first path includes the duct 166, duct 186, port 122, duct 188, passage 182, duct 196 and port 128. A second path includes the duct 166, duct 190, port 124, duct 192, passage 184, duct 194 and port 126. A third path includes the ducts 166, 172 and 198 to the port 128. In this condition, the duct 198 ensures that there is no unwanted build-up of pressure in the ports 122 and 124 caused by the relatively constricted flow paths which include those ports.

In use of the valve 120, the body 140 is fixably mounted relative to the vehicle with the axis 138 parallel to the forward direction of the vehicle. When cornering, the inertia of the mass 96 will cause rotation of the arm 94 relative to the body 140, the rotation being resisted by the action of the roller 178 moving in the cam 180. The arrangement is such that in normal circumstances, the valve element 144 is permitted to rotate say 10° in either direction depending upon the direction of cornering and in so doing altering the pressure and distribution of hydraulic fluid through the ports 122 and 124.

FIG. 13 diagrammatically shows the valve element 144 rotated in a clockwise direction (as seen in FIG. 13). When rotation commences in the clockwise direction, the port 170 will move to a position where it is more fully aligned with the duct 190 whereas the port 170 will no longer communicate with the duct 186. In this position hydraulic fluid flows through the port 124 to the line 50 to the cylinder 44 so as to move the ram 42 in the appropriate direction (upwards in FIG. 10). In this position, the duct 192 no longer communicates with the passage 184 so that pressure in the port 124 will not be reduced to the reservoir pressures because it is effectively isolated from the port 126. The ram 42 is able to move because hydraulic fluid flows from the return line 48 through the port 122, duct 188, passage 182, duct 196 to the port 128 and from there to the reservoir. The pressure in the port 124 is however subject to the bypass action of the pressure control duct 198 and its associated port 174. Generally speaking, the greater the degree of rotation of the element 144, the higher will be the pressure owing to the restriction and eventual closing of the fluid path between the port 174 and the Pressure Control duct 198. The restriction of this fluid path gradually reduces the effective size of a bypass flow path to the reservoir and thus gradually increases the pressure in the duct 166.

FIG. 16 graphically represents one arrangement in which the line 200 graphically illustrates a typical example of the pressure in the transverse duct 166 as a function of rotation of the element 144. It will be appreciated that other arrangements can be made to work satisfactorily but generally speaking it is desirable to restrict the range of rotation of the element 144. In the illustrated arrangement, the sudden increase in pressure of the line 200 at about 7° rotation occurs when the effective fluid flow path between the port 174 and duct 198 is being substantially reduced. In some circumstances, it may be desirable to limit the rotation of the element 144 so that the port is never completely closed off from the duct 198 so as to avoid undesirable pressure levels.

FIG. 14 illustrates the corresponding arrangement with an anticlockwise rotation of the element 144. In this case, the port 170 communicates with the duct 186 of the port 122 which operates to pass fluid under pressure to the line 48, the line 50 functioning as a return line in a manner which is generally analogous to that described with reference to FIG. 13.

The greater the inertial force acting on the mass 96 due to cornering of the vehicle, the higher will be the pressure in one or other of the ports 122 or 124, as indicated by the line 200 in the graph of 16. Thus the movement of the ram 42 from its central position will be a function of the inertial forces acting on the vehicle and hence the antiroll effect will be generally proportional to the inertial forces acting on the vehicle.

FIG. 15 illustrates a modified shape and location of the antiroll bar. In this arrangement, the bar 34 and arms 38 and 40 are replaced by a composite bar assembly 202 which has a central portion 204 which is mounted for rotation on the axles 20 and 22 by means of saddles 206 and 208. The central portion 204 is integrally formed with forwardly extending arms 210 and 212. The forward ends of the arms 210 and 212 are pivotally connected to the cylinder 44 and link 46 respectively. This arrangement functions analogously to that described with reference to FIGS. 3, 4 and 5 and need not be described in detail.

Many modifications will be apparent to those skilled in the art without departing from the spirit and scope of the invention.

I claim:

1. An antiroll suspension for a vehicle, said vehicle including a chassis, a pair of wheels mounted on axles, and springs acting between the chassis and the axles, said suspension comprising: a torsion bar mounted transversely of the chassis for rotation about an axis; a first arm and a second arm extending from the bar; a third arm and a fourth arm pivotally connected to the first and second arms respectively, the third and fourth arms being coupled to the axles wherein at least one of the arms includes an extensible strut which on operation thereof effectively alters the length of said at least one arm; and control means to control extension and retraction of said at least one arm and rotation of the torsion bar generally in proportion to laterally directed centrifugal forces acting on the vehicle, in use.

2. A suspension as claimed in claim 1 wherein said at least one arm comprises a fluid activated cylinder and ram.

3. A suspension as claimed in claim 2 wherein the control means includes sensing means for sensing lateral acceleration of the vehicle during cornering, and pressure control means for varying the pressure of an operating fluid supplied to the cylinder in accordance with the magnitude of said lateral acceleration, the sensing means being operable to determine whether the ram performs at least one of extending and contracting from an equilibrium position.

4. A suspension as claimed in claim 3 wherein the sensing means includes a pendulum mass which is moveable in use relative to the vehicle on cornering.

5. A suspension as claimed in claim 4 wherein the sensing means includes a micro-switches which are operated in accordance with movement of said pendulum mass and a control valve which controls the flow of fluid to said cylinder in accordance with signals from said micro-switches.

6. A suspension as claimed in claim 4 wherein said pendulum mass is mounted on a pendulum arm, and wherein the pressure control means comprises first and second pressure control valves which are alternately opened or closed in accordance with the sense or rotation of said pendulum arm.

7. A suspension as claimed in claim 6 wherein the first and second pressure control valves include valve seats and valve elements and operating means for coupling the valve elements to said pendulum arm such that the valve elements are unseated from the valve seats generally proportionally to the rotation of said pendulum arm, to thereby effect said variation of pressure of the operating fluid.

8. A suspension as claimed in claim 7 wherein said first and second pressure control valves are connected in fluid bypass lines which interconnect an output line from a pump to a return line to a reservoir.

9. A suspension as claimed in claim 7 wherein said pendulum arm is mounted for pivotal movement and said pendulum mass is mounted on one end thereof and a roller is mounted on the other end thereof, said roller being engaged by a pair of operating shafts one or the other of which is displaced from an equilibrium position in accordance with the direction of rotation of said pendulum arm.

10. A suspension as claimed in claim 4 wherein the control means comprises a rotary valve which includes said sensing means and said pressure control means.

11. A suspension as claimed in claim 10 including a pendulum arm upon which the pendulum mass is mounted.

12. A suspension as claimed in claim 11 wherein the rotary valve includes a valve body and a valve element mounted for rotation in a recess in the valve body, the pendulum arm being coupled to cause rotation of the valve element from an equilibrium position in accordance with a cornering motion of the vehicle.

13. A suspension as claimed in claim 12 wherein the rotary valve includes return means for returning the valve element to the equilibrium position when the vehicle is not cornering.

14. A suspension as claimed in claim 13 wherein the return means comprises a roller which can be urged into engagement with a cam surface formed in the recess.

15. A suspension as claimed in claim 14 wherein the roller is urged into engagement with the cam surface by said operating fluid.

16. A suspension as claimed in claim 12 including a pump arranged to supply said operating fluid from a reservoir and wherein the valve body includes an inlet port and first and second outlet ports connected by lines to opposite ends of said cylinder and wherein the valve element includes a transfer duct which extends therethrough and provides fluid communication from the inlet port to said outlet ports.

17. A suspension as claimed in claim 16 wherein said transfer duct communicates with both said outlet ports when the valve element is in said equilibrium position and communicates with one only of said outlet ports on rotation thereof from said equilibrium position.

18. A suspension as claimed in claim 17 wherein the valve body includes first and second return ports which are coupled by lines to the reservoir and wherein the valve body further includes first, second, third and fourth return ducts which extend from the first and second outlet ports and first and second return ports, respectively.

19. A suspension as claimed in claim 18 wherein the valve element includes first and second transfer passages for selectively communicating the first and fourth return ducts and the second and third return ducts.

20. A suspension as claimed in claim 16 wherein the valve body includes a pressure control duct which is coupled to said reservoir and the valve element includes a pressure control duct which communicates with the transfer duct.

21. A suspension as claimed in claim 20 wherein the extent of rotation of the valve element from its equilibrium position determines the alignment of the pressure control ducts and therefore the effective cross sectional area of the fluid flow path therebetween to thereby have a throttling effect on the operating fluid passing therethrough.

22. An antiroll suspension for a vehicle comprising:
an arm formed for movable mounting to said vehicle;
an extensible strut connected to said first arm and formed for mounting to a vehicle wheel and axle assembly; and
control means connected to said extensible strut to control extension and retraction from an equilibrium position of said extensible strut generally in proportion to laterally directed centrifugal forces acting on said vehicle, said control means including:
 (i) sensing means for sensing lateral acceleration of said vehicle during cornering, said sensing means being operable to determine whether said extensible strut is moved from said equilibrium position;
 (ii) a valve body having an inlet port and first and second outlet ports, first and second return ports, and first, second, third and fourth return ducts which extend from said first and second outlet ports and said first and second return ports, respectively, and
 (iii) a valve element mounted for movement from an equilibrium position in accordance with a cornering motion of said vehicle, said valve element includes a transfer duct which extends therethrough and provided communication from said inlet port to said outlet ports of said valve body, said transfer duct further communicating with both said outlet ports, when said valve element is in an equilibrium position, and communicating with one only of said outlet ducts on movement thereof from said equilibrium position.

23. A suspension as defined in claim 22 wherein,
said extensible strut comprises a fluid activated cylinder, and said control means further includes a pressure control means for varying the pressure of an operating fluid supplied to said cylinder in accordance with the magnitude of said lateral acceleration.

24. A suspension as defined in claim 23 including,
a pump arranged to supply said operating fluid from a reservoir, said first and second return ports are coupled by lines to said reservoir, and said first and second outlet ports connected by lines to opposite ends of said cylinder.

25. A suspension as defined in claim 24 wherein,
said valve element includes first and second transfer passage for selectively communicating said first and fourth return ducts and said second and third return ducts.

26. A suspension as defined in claim 25 wherein,
said valve body includes a pressure control duct which is coupled to said reservoir and said valve element includes a pressure conduct which communicates with said transfer duct.

27. A suspension as defined in claim 26 wherein,
the extent of movement of said valve element from its equilibrium position determines the alignment of said pressure control ducts and therefore the effective cross sectional area of the fluid flow path therebetween to thereby have a throttling effect on said operating fluid passing therethrough.

* * * * *

UNITED STATES PATENT AND TRADEMARK OFFICE
CERTIFICATE OF CORRECTION

PATENT NO. : 5,106,120
DATED : April 21, 1992
INVENTOR(S) : Philip Di Maria

It is certified that error appears in the above-identified patent and that said Letters Patent is hereby corrected as shown below:

Column 5, line 30, delete "Projects" and insert therefor

---projects---.

Column 6, lines 39 and 40, before "198" delete "Pressure

Control duct" and insert therefor ---pressure control duct---.

Claim 1, Column 7, line 29, after "coupled to" insert

---one of--- and after "axles" insert ---and the chassis---.

Signed and Sealed this

Twenty-second Day of June, 1993

Attest:

MICHAEL K. KIRK

*Attesting Officer*     *Acting Commissioner of Patents and Trademarks*